US006207093B1

United States Patent
Hanyu et al.

(12) 
(10) Patent No.: US 6,207,093 B1
(45) Date of Patent: Mar. 27, 2001

(54) COMPOSITIONS FOR IMPROVED ORIENTATION PROCESSING

(75) Inventors: Aiko Hanyu; William R. Wheat, both of Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/065,719

(22) Filed: Apr. 24, 1998

(51) Int. Cl.$^7$ .................................................. B29C 47/00
(52) U.S. Cl. ........................... 264/210.6; 264/290.2; 524/271; 524/528; 428/910; 525/240
(58) Field of Search ........................ 524/271, 528; 525/210, 240; 428/910; 264/210.6, 290.2

(56) References Cited

U.S. PATENT DOCUMENTS

| | | | |
|---|---|---|---|
| 4,298,718 | 11/1981 | Mayr et al. | 526/125 |
| 4,544,717 | 10/1985 | Mayr et al. | 526/125 |
| 4,692,380 | 9/1987 | Reid | 428/349 |
| 4,701,432 | 10/1987 | Welborn, Jr. | 502/113 |
| 4,794,096 | 12/1988 | Ewen | 502/117 |
| 4,808,561 | 2/1989 | Welborn, Jr. | 502/104 |
| 4,975,403 | 12/1990 | Ewen | 502/113 |
| 5,213,744 | 5/1993 | Bossaert | 264/171 |
| 5,242,876 | 9/1993 | Shamshoum et al. | 502/113 |
| 5,243,002 | 9/1993 | Razavi | 526/170 |
| 5,308,811 | 5/1994 | Suga et al. | 502/62 |
| 5,444,134 | 8/1995 | Matsumoto | 526/159 |
| 5,573,723 | 11/1996 | Peiffer et al. | 264/448 |
| 5,691,043 | * 11/1997 | Keller et al. | 428/212 |
| 5,766,532 | * 6/1998 | Peiffer et al. | 264/210.6 |
| 5,888,640 | * 3/1999 | Marotta et al. | 428/910 |

FOREIGN PATENT DOCUMENTS

| | | |
|---|---|---|
| 2178104 | 12/1996 | (CA). |
| 98/52742 | * 11/1998 | (WO). |

OTHER PUBLICATIONS

Lee, Polymer Handbook, 2nd ed., Bradrup et al., John wiley & Sons, New York, pp. III–139 to III–141, 1975.*
ASTM E 1356–91 (Reapproved 1995), American Society for Testing & Materials, West Conshohocken, PA (1995).*

* cited by examiner

*Primary Examiner*—Donald R. Wilson
(74) *Attorney, Agent, or Firm*—Jim Wheelington; William D. Jackson

(57) ABSTRACT

The present invention relates to improved processability of polyolefin films through the addition to the basic isotactic polypropylene (iPP) polymer of a syndiotactic polypropylene (sPP) in an amount within the range of about 2 to 10 weight percent and of a resin or rosin modifier in an amount within the range of 1 to 30 weight percent. Preferably, the composition could contain syndiotactic propylene in an amount within the range of about 2 to 5 weight percent. Preferably, about 3 weight percent of syndiotactic propylene is present in the polyolefin composition. The resin or rosin modifier could, preferably, be present in an amount within the range of 5 to 10 weight percent. Preferably, the composition should contain about 10 weight percent of the modifier. The present invention encompasses both the resulting polyolefin films and the process for producing such films. The improved processability of the film includes fewer webs breaks and drawability at higher line speeds, resulting in fewer shut downs of the processing line and a decrease in manufacturing time. These improvements are measured in terms of variable machine direction orientation draw ratios and transverse direction orientation oven temperatures.

29 Claims, 2 Drawing Sheets

COMPOSITIONS FOR IMPROVED ORIENTATION PROCESSING

FIELD OF THE INVENTION

This invention relates to oriented polyolefin films, and more particularly to improved processability of polyolefin compositions which incorporate syndiotactic polypropylenes and styrenic hydrocarbon resins.

BACKGROUND OF THE INVENTION

Biaxial orientation of polyolefins, particularly polypropylenes, produces films which have applications in the polyolefin film business, for example snack food packaging, cigarette overwrap, electronic components wrapping, packaging tape, and shrink film. The polymers normally employed in the preparation of biaxially oriented films are isotactic homopolymers with high stereoregularity, although on some occasions the use of syndiotactic polymers has been proposed. Also suitable are co-polymers of isotactic polypropylenes with a small content of ethylene (mini-random co-polymers).

Isotactic polypropylene is one of a number of crystalline polymers which can be characterized in terms of the stereoregularity of the polymer chain. Various stereo specific structural relationships denominated primarily in terms of syndiotacticity and isotacticity may be involved in the formation of stereoregular polymers of various monomers.

Isotactic polypropylene is conventionally used in the production of relatively thin films in which the polypropylene is heated and then extruded through dies and subject to biaxial orientation by stressing the film in both a longitudinal direction (referred to as the machine direction) and lateral direction sometimes referred to as the tenter direction. The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following structural formula:

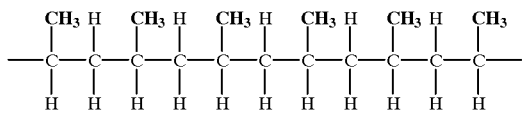

(1)

[Bolding for emphasis only]

Stereoregular polymers, such as isotactic and syndiotactic polypropylene can be characterized in terms of the Fisher projection formula. Another way of describing the structure is through the use of NMR. Bovey's NMR nomenclature for an isotactic pentad is . . . mmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the chain lie on alternate sides of the plane of the polymer. Syndiotactic polypropylene can be illustrated by the following structural formula:

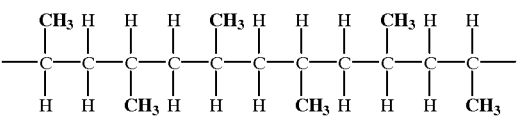

(2)

[Bolding for emphasis only]

Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product. In most cases, the preferred polymer configuration will be a predominantly isotactic or syndiotactic polymer with very little atactic polymer.

The isotactic polymers normally employed are typically prepared through the use of conventional Ziegler-Natta catalysts of the type disclosed, for example, in U.S. Pat. Nos. 4,298,718 and 4,544,717, both to Myer et al. U.S. Pat. No. 5,573,723 to Peiffer discloses a process for producing biaxially-oriented polypropylene film based on an isotactic polypropylene homopolymer or propylene ethylene co-polymers. Other co-polymers of propylene and alpha-olefins having from 4–8 carbon atoms also may be employed in the Peiffer process.

Catalysts employed in the polymerization of alpha-olefins may be characterized as supported catalysts or unsupported catalysts, sometimes referred to as homogeneous catalysts. Traditional supported catalysts are the so-called "conventional" Ziegler-Natta catalysts, such as titanium tetrachloride supported on an active magnesium dichloride as disclosed, for example, in the aforementioned patents to Myer et al. A supported catalyst component, as disclosed in the Myer '718 patent, includes titanium tetrachloride supported on an "active" anhydrous magnesium dihalide, such as magnesium dichloride or magnesium dibromide. The supported catalyst component in Myer '718 is employed in conjunction with a co-catalyst such and an alkylaluminum compound, for example, triethylaluminum (TSA1). The Myer '717 patent discloses a similar compound which may also incorporate an electron donor compound which may take the form of various amines, phosphenes, esters, aldehydes, and alcohols. Metallocene catalysts are often employed as unsupported or homogeneous catalysts, although, as described below, they also may be employed in supported catalyst components.

Alternative types of catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

$$R''(C_5(R')_4)_2HfQp \qquad (3)$$

In formula (3), $(C_5(R')_4)$ is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

The various metallocene structures as described above can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. For example, syndiospecific cationic metallocenes are disclosed in U.S. Pat. No. 5,243,002 to Razavi. As disclosed there, the metallocene cation is characterized by the cationic metallocene ligand having sterically dissimilar ring structures which are joined to a positively-charged coordinating transition metal atom. The metallocene cation is associated with a stable non-coordinating counter-anion. Similar relationships can be established for isospecific metallocenes.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, zirconia and the like. Non-metallocene transition metal compounds, such as titanium tetrachloride, are also incorporated into the supported catalyst component. The Welborn '561 patent discloses a heterogeneous catalyst which is formed by the reaction of a metallocene and an alumoxane in combination with the support material. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Shamsoum et al. Various other catalyst systems involving supported metallocene catalysts are disclosed in U.S. Pat. Nos. 5,308,811 to Suga et al and 5,444,134 to Matsumoto.

Polyolefin compositions which can be oriented at variable process conditions, particularly over a range of machine direction orientation draw ratios and transverse direction orientation oven temperatures, are desirable for a number of reasons. Film manufacturers have the flexibility to vary one or more processing conditions within an acceptable range for a particular film production run. In addition, the possibility of a web break during the orientation process is lessened, resulting in lower processing line start up costs. For example, a standard machine direction orientation draw ratio is about 5 times the original length of the polyolefin film. A standard transverse direction oven temperature is about 166° C. These processing conditions are considered standard in that the occurrence of web breaks in the film are infrequent. The ability to orient film compositions under variable conditions, for example a machine direction draw ratio within the range of its standard up to 9 times the original length, and a transverse direction oven temperature within the range of its standard to about 20° C. less than the standard, gives manufacturers greater latitude in the production of film products. A further processing advantage is the ability to draw the film at higher line speeds thereby decreasing the manufacturing time.

Biaxially-oriented films can have a number of properties to their advantage during and after the machine processing steps. A relatively low coefficient friction is desirable, both during the biaxially orientation procedure and in the use of the ultimately-produced biaxially-oriented film for end use applications. A relatively high stiffness, as indicated by the tensile modulus in both the machine direction and the transverse direction is usually advantageous. Relatively low permeabilities to gas and water are desirable. In addition, a high shrinkage factor of the processed film, while undesirable in some cases, can be advantageous in others, such as where the film is used in stretch wrapping of food products, electrical components, and the like.

Properties of the resulting film product can be dependent to a certain degree on the particular process conditions under which the polyolefin composition was manufactured. For example, a stiffer film with a higher shrinkage factor and better barrier properties would result from an orientation process incorporating a larger machine direction orientation draw ratio. Likewise, the transverse direction orientation oven temperature would affect the properties of the resulting oriented film product, particularly improving the shrinkage factor.

The physical and optical properties of films are important in the film industry and should fall within certain parameters for different film applications. The optical properties include haze, contact clarity (NAS), and gloss. Haze is a phenomena of light scattering and arises from local variations in the refractive index. Haze is defined as the relative fraction of scattered intensity from the dispersed particles in all directions, being detected in a range of wide angle, to the incident light intensity. Contact clarity or NAS is a measure of contact clearness or see-through quality and is different from haze due to the direct transmittance of light. For example, some films may indeed be hazy but appear clear as the film is in contact with the contents of a package. Unlike haze, NAS clarity is distance dependent so that the thinner the film, the better the contact clarity. Gloss is defined as the ratio of the reflected light intensity from the film at a specific angle of incidence light to that of a standard with the ideal smooth surface.

SUMMARY OF THE INVENTION

In accordance with the present invention, there is provided a novel process for the production of polyolefin film using polymer compositions, particularity highly stereo-regular polypropylenes or co-polymers of polypropylene with a small content of ethylene, which are blended with an amount of syndiotactic polypropylene and a resin or rosin modifier. The polymer compositions used in the present invention are predominantly an isotactic polypropylene blended with a syndiotactic polypropylene in an amount within the range of about 2 to 10 weight percent. Preferably, the composition could contain syndiotactic propylene in an amount within the range of about 2 to 5 weight percent. Preferably, about 3 weight percent of syndiotactic propylene is present in the polyolefin composition. A resin or rosin modifier is incorporated into the polyolefin composition in an amount within the range of about 1 to 30 weight percent. Preferably, the composition could contain from about 5 to 10 weight percent of a rosin or resin. Preferably, the polyolefin composition contains about 10 weight percent of the modifier. In a further aspect of the invention, there is provided a polyolefin film comprising a film layer formed of a mixture of a propylene homopolymer or a co-polymer containing a small amount of ethylene, blended with a syndiotactic propylene and a resin or rosin modifier. The syndiotactice propylene and resin or rosin modifier are present in the mixture in relative amounts effective to produce a biaxially-oriented polyolefin film capable of being stretched up to 9 times its original length in the machine direction and stretched in the transverse direction at a temperature equal to or less than approximately 166° C. These particular homopolymer or co-polymer compositions exhibit improved processability during the biaxially oriented process measured in terms of machine direction orientation draw ratios and transverse direction orientation oven temperatures. The improved processability includes fewer web breaks and drawability at higher line speeds, resulting in fewer shut downs of the processing line and decreased production time.

DETAILED DESCRIPTION OF THE INVENTION

Figure 1:
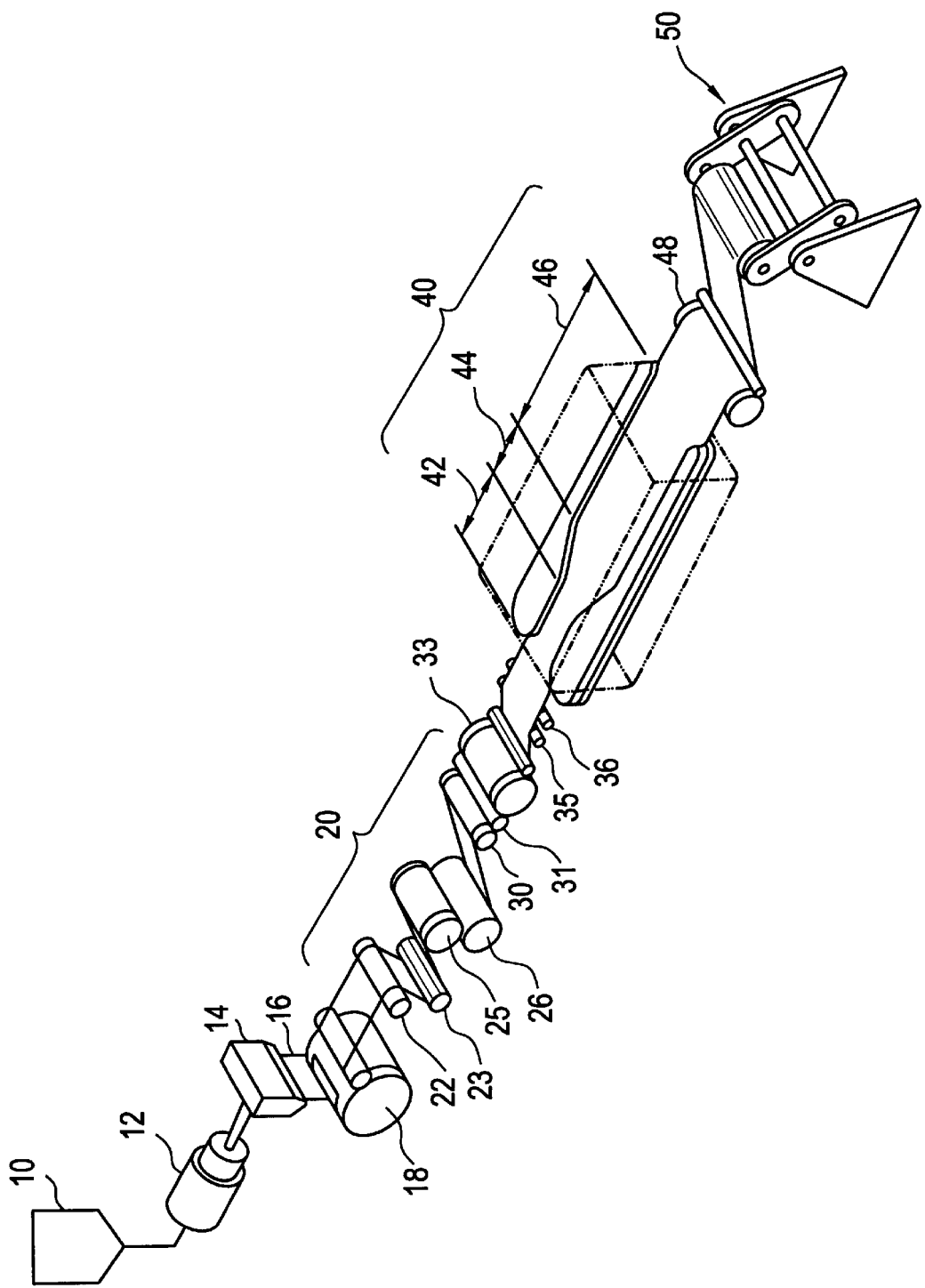
FIG. 1 is a diagram reflecting an exemplary tenter-frame process for producing biaxially oriented polypropylene films.

The biaxially oriented films of the present invention involve the use of an amount of syndiotactic polypropylene and a resin or rosin modifier in combination with isotactic polypropylene in the production of film with enhanced processability characteristics.

Biaxially oriented films are characterized in terms of certain well-defined characteristics relating to their stereoregular structures and physical properties, including melt temperatures and shrinkage characteristics, as well as in relatively low coefficients of friction and relatively high tensile moduli and good barrier properties including relatively low permeation rates to oxygen and water. The biaxially-oriented films of the present invention are formed using a particularly configured polyolefin polymer as described in greater detail below and by using any suitable oriented film production technique, such as the conventionally-used tenter frame process.

The present invention addresses oriented films involving the combination of isotactic and syndiotactic polypropylene with a resin or rosin modifier. While the preferred method involves separate polymerization of the isotactic and syndiotactic polypropylene followed by combination either after or before the pelletizing process, alternatively, the propylene could be polymerized relative amount of syndiotactic and isospecific polypropylene desired in the final product. The product of such a polymerization would also be effective in practicing the invention.

The polymerized mixture will often further include minor amounts (typically less than 1 weight percent, and more typically less than 0.5 weight percent) of additives designed to enhance other physical or optical properties. Such mixtures may have, for example, one or more antioxidants present in an amount totaling no more than about 0.25 weight percent (in the tested examples below about 0.18 weight percent) and one or more acid neutralizers present in an amount totaling no more than about 0.25 weight percent (in the tested examples below about 0.05 weight percent). Although not present in the tested examples, additives acting as anti-block agents may also be present, again in relatively low percentages such as no more than about 1 weight percent, more preferably no more than about 0.5 weight percent, and even more desirably no more than about 0.25 weight percent.

The polyolefins from which the film of the present invention are made are preferably isotactic homopolymers with high stereoregularity. An especially preferred polyolefin is an isotactic polypropylene with a density of from about 0.890 to 0.915 g/cc and a melt flow index of from about 1 to 5 g/10 min as determined according to ASTM D1238 (conditions 230° C. and 2.16 kg). It may be made by conventional Ziegler-Natta polymerization methods. The isotactic polypropylene may also be prepared through the use of metallocene catalysts.

Alternatively, a co-polymer of propylene with up to about one (1) weight percent of another olefin, e.g. ethylene, could be used. This mini-random co-polymer of propylene and ethylene is preferably an isotactic propylene-ethylene copolymer of about 0.6 weight percent ethylene with a density of from about 0.880 to 0.910 g/cc as measured at 25° C. according to ASTM D1505 and a melt flow index of from about 1 to 5 g/10 min as determined according to ASTM D1238 (conditions 230° C. and 2.16 kg). It may be made by well-known polymerization methods using a Ziegler-Natta catalyst or a metallocene catalyst.

Another component in the polyolefin composition is a syndiotactic polypropylene. Preferably, the syndiotactic polypropylene is polymerized separately from the isotactic polypropylene followed by their combination either before or after the pelletizing process. Alternatively, the polypropylene could be polymerized using both syndiospecific and isospecific catalysts in amounts proportionate to the relative amount of syndiotactic and isotactic polypropylene desired in the final product. The polyolefin composition may contain syndiotactic polypropylene in an amount within the range of about 2 to 10 weight percent. More specifically, it can contain syndiotactic polypropylene in an amount within the range of about 2 to 5 weight percent. Preferably, about 3 weight percent of syndiotactic polypropylene is present in the polyolefin composition.

Additives can be used in the polyolefins to affect various parameters of the biaxial oriented machine process conditions and the physical properties of the end film product. Among such additives are resin or rosin-type modifiers of the type disclosed, for example, in U.S. Pat. No. 5,213,744 to Bossaert, the entire disclosure of which is incorporated herein by reference. A wide range of such additives are disclosed in Bossaert including hydrocarbon resins, such a polyturpine resins; petroleum resins; various rosin derivatives, including rosin alcohols and esters; and hydrogenated natural wood rosins. The rosin or resin modifiers disclosed in Bossaert are used in relatively high concentrations. While, as noted below, the various rosin and resin modifiers in Bossaert can be used in carrying out the present invention, preferably, they are used in amounts well below those disclosed in Bossaert. For example, Bossaert discloses preferred resin or rosin concentrations of 22–60 weight percent, and the various examples disclose such concentrations of about 50–70 weight percent yielding the best results. Preferably the resin or rosin used in the present invention is hydrogenated and can be natural or synthetic. These resins can have a softening point within the range of 60° C. to 180° C., preferably within the range of 136° C. to 142° C. Suitable resin and rosins are the liquid and amorphous semi-solid petroleum hydrocarbons, asphalt, hydrocarbon resins such as the polyterpene resins, coal and petroleum resins, rosins, rosin derivatives, and styrene resins.

As disclosed by the Bossaert '744 patent, the polyterpene resins are a well-known class of resinous materials obtained by the polymerization or copolymerization of terpene hydrocarbons such as the alicyclic, mon-cyclic and bicyclic terpenes, and their mixtures, including carene, isomerised pinene, dipentene, terpinen, terpinolene, turpentine, a terpene cut or fraction, and various other terpenes.

Hydrogenation of the polyterpenes is accomplished by any of the conventional hydrogenation processes. Generally the hydrogenation is carried out utilizing a catalyst such as nickel, nickel on kieselguhr, copper chromite, palladium-on alumina, or cobalt plus zirconia or kieselguhr. The hydrogenation is preferably carried out in the presence of a solvent such as methyl cyclohexane, toluene, p-methane, for example, utilizing pressures ranging 500 to 10,000 p.s.i. and temperatures of 150° C. to 300° C.

The petroleum resins are produced by the catalytic or thermal polymerization of a mixture of monomers derived from deep cracking petroleum whose monomers are mono- and di-olefins. The petroleum resins can be hydrogenated similar to the terpene resins.

Another type of hydrocarbon resins is the polymers of unsaturated coal tar by-products such as polyindene and coumaroneindene resins. Other types include styrene resins, for example, polystyrene, styrene-olefin and styrene-diolefin copolymers, poly a-methylstyrene, and a-methyl-styrene-vinyl toluene copolymer. These resins will generally have a softening point within the range of 50° C. to about 150° C.

The well-known types of rosins can be used in accordance with the present invention, such as wood rosin, gum rosin, tall oil rosin, and the modified rosins, such as partially or substantially completely hydrogenated rosins, dehydrogenated rosins, disproportionated rosins, polymerized rosins. In addition, rosin alcohols and heat treated rosins are suitable. These rosins have softening points of at least 60° C.

Rosin esters which are suitable include the polyhydric alcohol esters of natural rosins. Hydrogenated rosins, polymerized rosins, such as the glyceral and pentaerythritol esters of wood rosin, the ethylene glycol, glycerol and pentaerythritol esters of polymerized rosin, the glycerol and pentaerythritol esters of the hydrogenated rosins.

Resins which can be hydrogenated are hydrocarbon resins, ketone resins, polyamide resins, colophonium, courmarone resins, terpene resins, chlorinated aliphatic or aromatic hydrocarbon resins. Typical of such resins are those manufactured by Hercules Inc. under the designation T140. These are resins of low molecular-weight (MW) hydrogenated aliphatic hydrocarbon resins. The T140 resin has a weight averaged molecular weight (MW) of about 750 g/mol, a softening point of about 136° C. to 142° C., and a glass transition temperature of about 90° C.

The polyolefin film composition of the present invention may contain a resin or rosin in an amount within the range of about 1 to about 30 weight percent. Alternatively, the composition could contain from about 5 to about 10 weight percent of a resin or rosin. Preferably, the polyolefin composition could contain about 10 weight percent of the resin or rosin. The polyolefin and resin components may be physically blended prior to melt blending or may be melt blended in a screw extruder or kneader in amount proportionate to the relative amounts desired in the final product.

The addition of a resin or rosin and a syndiotactic polypropylene improves the processability of the polyolefin composition. The improved processability is measured in terms of machine direction orientation draw ratio and transverse direction orientation oven temperature. During biaxial orientation, the occurrence of web breaks in the film of the present invention is less frequent at standard machine direction orientation draw ratios and transverse direction orientation oven temperatures. Accordingly, the draw ratios in the machine direction can be increased and the oven temperatures of the transverse direction orientation can be lowered while processing the composition of the present invention with few web breaks. In addition, the drawability of the polyolefin composition can be accomplished at higher line speeds. The polyolefin compositions used in the present invention are desirable in that these physical and optical properties of the resulting film product are not significantly altered by the variable processing conditions.

In general, biaxially oriented film production can be of any suitable technique, such as disclosed in Canadian Patent Application No. 2,178,104 to Peiffer et al. As described in the Peiffer et al application, the entire disclosure of which is incorporated herein by reference, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions. The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometime with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as a surface treatment (for example corona treatment or flame treatment), as described, for example, in the aforementioned Canadian Patent Application No. 2,178,104 or in U.S. Pat. No. 4,692,380 to Reid, the entire disclosure of which is incorporated herein by reference. The film may also be metallized as described in U.S. Pat. No. 4,692,380 to Reid. While corona and flame treatment typically occurs immediately following orientation and prior to the initial roll up, metallizing is typically performed at a separate time and location.

Turning now to FIG. 1, there is shown a schematic illustration of a suitable "Tenter Frame" orientation process which may be employed in producing biaxially-oriented polypropylene film in accordance with the present invention. More particularly and with reference to FIG. 1, a source of molten polymer is supplied from a heated hopper 10 to an extruder 12 and from there to a slot die 14 which produces a flat, relatively thick film 16 at its output. Film 16 is applied over a chill roller 18, and it is cooled to a suitable temperature within the range of about 30–60° C. The film is drawn off the chill roller 18 to a stretching section 20 to which the machine direction orientation occurs by means of idler rollers 22 and 23 which lead to preheat rollers 25 and 26.

As the film is drawn off the chill roller 18 and passed over the idler rollers, it is cooled to a temperature of about 30–60° C. In stretching the film in the machine direction, it is heated by preheat rollers 25 and 26 to an incremental temperature increase of about 60–100° C. and then passed to the slow roller 30 of the longitudinal orienting mechanism. The slow roller may be operated at any suitable speed, usually about 20–40 feet per minute in this type of pilot production line. The fast roller 31 is operated at a suitable speed, typically about 150 feet per minute in a pilot line, to provide a surface speed at the circumference of about 4–7 times that of the slow roller in order to orient the film in the machine direction. In a commercial production line, casting speeds may be much higher such as 20 to 60 meters per minute, with 120 to 360 meters per minute in final speeds.

As the oriented film is withdrawn from the fast roller, it is passed over a roller 33 at room temperature conditions. From here it is passed over tandem idler rollers 35 and 36 to a lateral stretching section 40 where the film is oriented by stretching in the transverse direction. The section 40 includes a preheat section 42 comprising a plurality of tandem heating rollers (not shown) where it is again reheated to a temperature within the range of 130–180° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. Lateral stretching ratios are typically greater than machine direction stretch ratios and often range anywhere from 5–12 times the original width. Ratios of 8–10 times are usually preferred. The concluding portion of the lateral stretching phase includes an annealing section 46, such as an oven housing, where the film is heated at a temperature within the range of 130–170° C. for a suitable period in time, about 1–10 seconds. The annealing time helps control certain properties, and increased annealing is often specifically used to reduce shrinkage. The biaxially oriented film is then withdrawn from the tenter frame and passed over a chill roller 48 where it is reduced to a temperature of less than about 50° C. and then applied to take-up spools on a takeup mechanism 50. From the foregoing description, it will be recognized that the initial orientation in the machine direction is carried out at a somewhat lower temperature than the orientation in the lateral dimension. For example, the film exiting the preheat rollers is stretched in the machine direction at a temperature of about 120° C. The film may be cooled to a temperature of about 50° C. and thereafter heated to a temperature of about 160° C. before it is subject to the progressive lateral dimension orientation in the tenter section.

The following example illustrates the unexpected advantages in the biaxial orientation processability provided by the present invention. The example also provides an illustration of the effects of the present invention on other physical and optical properties.

EXAMPLE

Several compositions with varying amounts of primarily isotactic polypropylene (referred to simply hereinafter as isotactic polypropylene or "iPP"), blended with syndiotactic polypropylene (referred to simply hereinafter as syndiotactic polypropylene or "sPP") and a hydrocarbon resin, were processed through a biaxially-oriented polypropylene film making process using a tenter frame system while measuring their processing properties. The isotactic polypropylene was polymerized separately from the syndiotactic polypropylene, and the resulting polymer fluffs blended in a separate compounding step in the pelletizing process. The hydrocarbon resin was then melt blended with the polymer fluffs in a screw extruder.

The trial was conducted in a sixty inch continuous pilot tenter line capable of 76.2 meter per minute output. Biaxial orientation of flat films was carried out in two sequential steps. The casted sheet chilled on a rotating cold steel roll was first stretched longitudinally (in the machine direction or "MD") in the tangential gap between sets of rolls rotating at different speeds. Subsequently, the film was stretched transversely (in the transverse direction or "TD") in a tenter frame in which the edges of the film were gripped by a series of clips and diverged in TD.

Four samples of polyolefin compositions were evaluated for orientation processability by increasing the machine direction orientation (MDO) stretch ratio and lowering the transverse direction orientation (TDO) oven temperature from their standards until web breaks occurred. Standard MDO draw ratio was 5 times the original length of the film in one stage while the TDO draw ratio was consistently 9 times the original width. The MDO stretch experiments were performed at a constant film thickness of approximately 0.7 mil. by varying the cast/chill roll speed while keeping the final film speed at 150 ft./min. Temperature settings are listed in Table 1 below:

TABLE 1

| Temp | Melt | Cast Roll | Chill Roll | MDO | | | TDO | | |
|---|---|---|---|---|---|---|---|---|---|
| | | | | Cond | Stretch | Anneal | Cond | Stretch | Anneal |
| ° C. | 235 | 54 | 43 | 116 | 121 | 138 | 168 | 166 | 160 |
| ° F. | 455 | 130 | 110 | 240 | 250 | 280 | 335 | 330 | 320 |

This process was used to evaluate the processability of the four biaxially oriented polypropylene film samples with various sPP and hydrocarbon resin fractions. The first sample was a homopolymer having a density of about 0.91 g/cm$^3$, xylene solubles of about 3.0 weight percent, and a melt flow index of about 1.8 g/10 min. as determined according to ASTM D1238 (conditions 230° C. and 2.16 kg). Additives in the polypropylene of the first sample included about 0.12 weight percent of Irganox 1010 and about 0.06 weight percent of Irganox 1076 (antioxidants), and about 0.05 weight percent of calcium stearate (an acid neutralizer).

The second sample was higher crystallinity polypropylene having a density of about 0.91 g/cm$^3$, xylene solubles in the range of about 1.5 to 2.0 weight percent, and a melt flow index in the range of about 2.0 to 2.5 g/10 min. as determined according to ASTM D1238 (conditions 230° C. and 2.16 kg). Additives contained in the second sample were the same and in the same amount as those in the first sample.

The third sample was a blend of about 97 weight percent of higher crystallinity polypropylene and about 3 weight percent of syndiotactic polypropylene. The blend has a density of about 0.91 g/cm$^3$, xylene solubles in the range of about 1.5 to 2.0 weight percent, and a melt flow index in the range of about 2.0 to 2.5 g/10 min. as determined according to ASTM D1238 (conditions 230° C. and 2.16 kg). Additives in the blend of the third sample were the same as those contained in the first and second samples.

The fourth sample was a blend of about 87 weight percent higher crystallinity polypropylene, about 3 weight percent syndiotactic polypropylene and about 10 weight percent of a low molecular-weight hydrogenated hydrocarbon resin. The blend has a density in the range of about 0.92 to 0.93 g/cm$^3$, xylene solubles of about 10.5 weight percent, and a melt flow index of about 3.3 g/10 min. as determined according to ASTM D1238 (conditions 230° C. and 2.16 kg). Again, additives in the polypropylene of the fourth sample were the same as those in the previous samples. The resin of the fourth sample has a weight averaged molecular weight (MW) of 750 g/mol, a softening point of 140° C., and a glass transition temperature of 90° C. More specifically, the modifier is the resin marketed by Hercules Inc. under the designation T140.

Figure 2B:
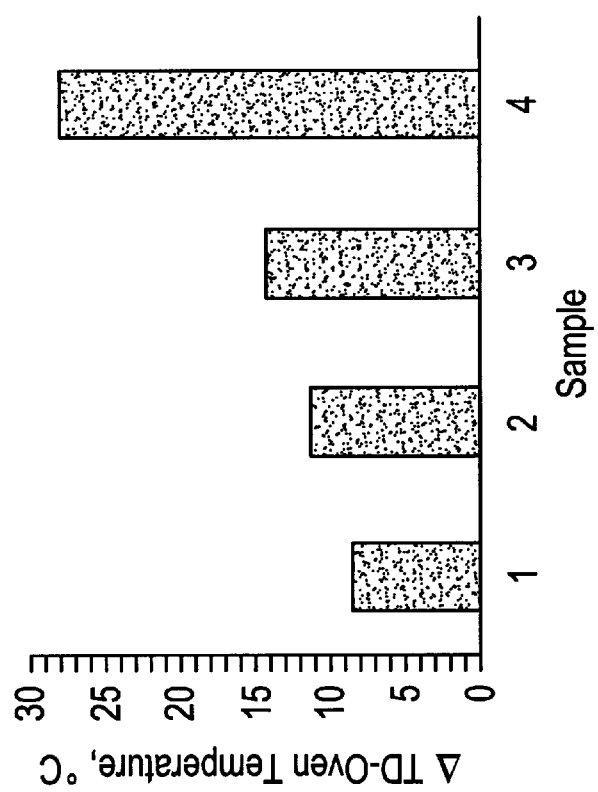
FIG. 2 are graphs illustrating machine direction orientation draw ratios, and the difference in transverse direction orientation oven temperatures between standard temperatures given in Table 1 and the lowest temperatures reached before web breakage of biaxially oriented polypropylene films.
Figure 2A:
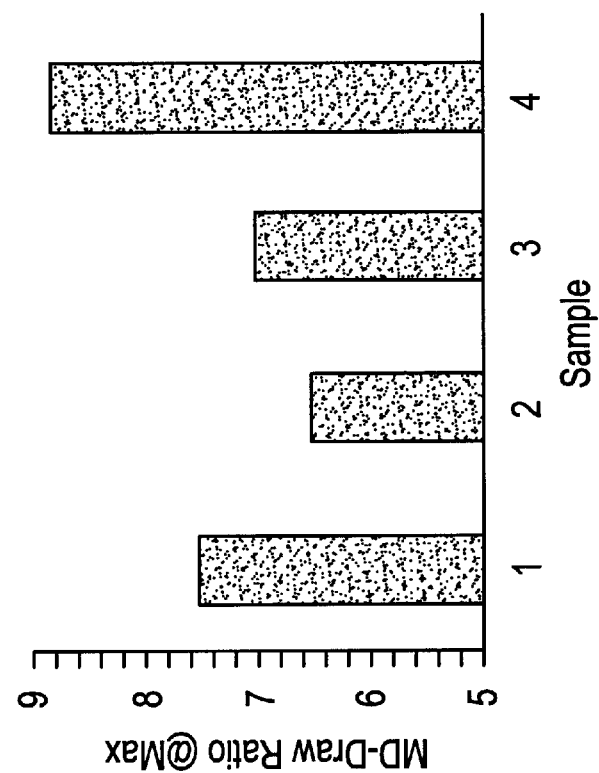

FIG. 2 compares processability of the four polyolefin compositions of biaxially oriented films in terms of the maximum draw ratio in MDO and the difference in TDO oven temperatures between the standard temperatures of Table 1 and the lowest temperatures reached before web breaks occurred.

As illustrated in FIG. 2, the polyolefin composition containing about 3 weight percent syndiotactic polypropylene and about 10 weight percent of the hydrocabon resin significantly increased the drawability in MDO and lowered the TDO oven temperatures. A MDO draw ratio of about 9 times the original length and a TDO oven temperature of about 28° C. less than the standard condition of about 166° C. in Table 1 were achieved by the composition without the occurrence of web breaks.

We claim:

1. In a process for producing a polyolefin film, the steps comprising:
    a. providing a polymer mixture comprising an isotactic propylene homopolymer and isotactic propylene-ethylene co-polymer containing no more than 1.0 weight percent ethylene, and having incorporated therein:
        a processing modifier selected from the group consisting of a resin and a rosin, in an amount within the range of 1 to 30 weight percent of said mixture, said resin selected from the group consisting of polyterpene resins, petroleum resins, polyindene resins, coumaroneindene resins, and styrene resins, said rosin being selected from the group consisting of wood rosin, gum rosin, toll oil rosin including hydrogenated, partially hydrogenated, dehydrogenated, and disproportionated polymerization products thereof; and
        a syndiotactic polypropylene in an amount within the range of 2 to 10 weight percent of said mixture; and
    b. forming a biaxially oriented film layer of said polymer mixture having an exposed surface by stretching said polymer mixture in longitudinal and transverse directions.

2. The process of claim 1, wherein the amount of said modifier is within the range of 5 to 10 weight percent of said mixture.

3. The process of claim 1, wherein said syndiotactic polypropylene is present in an amount of about 3 weight percent of said mixture.

4. The process of claim 1, wherein said syndiotactic polypropylene is present in an amount within the range of 2 to 5 weight percent of said mixture.

5. The process of claim 1, wherein the amount of said modifier is about 10 weight percent of said mixture.

6. The process of claim 4 wherein the isotactic propylene homopolymer is produced by the method of polymerizing propylene in the presence of a metallocene catalyst.

7. The process of claim 5, wherein the propylene polymer of step (a) is an isotactic propylene homopolymer.

8. In a process for producing a polyolefin film, the steps comprising:
    a. providing a polymer mixture comprising an isotactic propylene-ethylene co-polymer containing no more than 1.0 weight percent ethylene, and having incorporated therein:
        a processing modifier selected from the group consisting of a resin and a rosin, in an amount within the range of 1 to 30 weight percent of said mixture, said resin selected from the group consisting of polyterpene resins, petroleum resins, polyindene resins, coumaroneindene resins, and styrene resins, said rosin being selected from the group consisting of wood rosin, gum rosin, toll oil rosin including hydrogenated, partially hydrogenated, dehydrogenated, and disproportionated polymerization products thereof; and
        a syndiotactic polypropylene in an amount within the range of 2 to 10 weight percent of said mixture; and
    b. forming a biaxially oriented film layer of said polymer mixture having an exposed surface by stretching said polymer mixture in longitudinal and transverse directions.

9. The process of claim 8, wherein said syndiotactic polypropylene is present in an amount within the range of 2 to 5 weight percent of said mixture.

10. The process of claim 8, wherein said syndiotactic polypropylene is present in an amount of about 3 weight percent of said mixture.

11. The process of claim 8, wherein the isotactic propylene ethylene copolymer is produced by the method of polymerizing propylene in the presence of a metallocene catalyst.

12. The process of claim 11, wherein said syndiotactic polypropylene is present in an amount of about 3 weight percent of said mixture.

13. The process of claim 11 wherein the isotactic propylene homopolymer is produced by the method of polymerizing propylene in the presence of a metallocene catalyst.

14. The process of claim 11, wherein said syndiotactic polypropylene is present in an amount within the range of 2 to 5 weight percent of said mixture.

15. The process of claim 14 wherein the isotactic propylene ethylene copolymer is produced by the method of polymerizing propylene in the presence of a metallocene catalyst.

16. In a process for producing a polyolefin film, the steps comprising:
    a. providing a propylene polymer composition of isotactic polypropylene and syndiotactic polypropylene produced by the method of polymerizing propylene in the presence of an isospecific catalyst and a syndiospecific catalyst, said catalysts being present in relative amounts sufficient for said propylene polymer to contain syndiotactic polypropylene in an amount within the range of 2 to 10 weight percent;
    b. providing a processing mixture of said propylene polymer and a modifier selected from the group consisting of a resin and a rosin, in an amount within the range of 1 to 30 weight percent of said mixture, said resin selected from the group consisting of polyterpene resins, petroleum resins, polyindene resins, coumaroneindene resins, and styrene resins, said rosin being selected from the group of wood rosin, gum rosin, toll oil rosin including hydrogenated, partially hydrogenated, dehydrogenated, and disproportionated polymerization products thereof; and c. forming said mixture into a film layer having an exposed surface.

17. The process of claim 16, further comprising the step of stretching said film layer in the machine direction and separately stretching said film layer in the transverse direction to produce a biaxially-oriented polyolefin film.

18. The process of claim 16, wherein the amount of said modifier is within the range of 5 to 10 weight percent of said mixture.

19. The process of claim 16, wherein the amount of said modifier is about 10 weight percent of said mixture.

20. The process of claim 18, further comprising the step of stretching said film layer in the machine direction and separately stretching said film layer in the transverse direction to produce a biaxially-oriented polyolefin film.

21. The process of claim 19, further comprising the step of stretching said film layer in the machine direction and separately stretching said film layer in the transverse direction to produce a biaxially-oriented polyolefin film.

22. In a polyolefin film, the composition comprising:

a. a film layer having an exposed surface formed of a mixture of:
 a propylene polymer selected from the group consisting of isotactic propylene homopolymer and an isotactic propylene-ethylene co-polymer containing no more than 1.0 wt. % ethylene,
 a syndiotactic propylene, and
 a processing modifier selected from the group consisting of a resin and a rosin, said resin selected from the group consisting of polyterpene resins, petroleum resins, polyindene resins, coumaroneindene resins, and styrene resins, said rosin being selected from the group consisting of wood rosin, gum rosin, toll oil rosin including hydrogenated, partially hydrogenated, dehydrogenated, and disproportionated polymerization products thereof; and b. said syndiotactic propylene and said modifier present in said mixture in relative amounts effective to produce a biaxially-oriented polyolefin film capable of being stretched up to 9 times its original length in the machine direction and stretched in the transverse direction at a temperature equal to or less than 166° C.

23. The composition of claim 22, wherein said modifier is a hydrogenated hydrocarbon resin having a molecular weight of about 750 g/mol, a softening point within the range of 136° C. to 140° C. and a glass transition temperature of about 90° C.

24. The composition of claim 22, wherein said syndiotactic propylene is present in said mixture in an amount within the range of 2 to 10 weight percent of said mixture and said modifier is present in said mixture in an amount within the range of 1 to 30 weight percent of said mixture.

25. The composition of claim 24, wherein said syndiotactic propylene is present in said mixture in an amount of about 3 weight percent of said mixture.

26. The composition of claim 24, wherein said syndiotactic propylene is present in said mixture in an amount within the range of 2 to 5 weight percent of said mixture.

27. The composition of claim 25, wherein said modifier is present in said mixture in an amount of about 10 weight percent of said mixture.

28. The composition of claim 26, wherein said modifier is present in said mixture in an amount within the range of 5 to 10 weight percent of said mixture.

29. The composition of claim 28, wherein said modifier is present in said mixture in an amount of about 10 weight percent of said mixture.

\* \* \* \* \*